United States Patent [19]

Ratledge et al.

[11] Patent Number: 5,310,984
[45] Date of Patent: May 10, 1994

[54] LINE VOLTAGE COMPENSATION FOR AC RESISTANCE WELDING SYSTEMS AND THE LIKE

[75] Inventors: Thomas L. Ratledge, Carlsbad; Joseph E. Donner, Vista, both of Calif.

[73] Assignee: Hughes Aircraft Company, Los Angeles, Calif.

[21] Appl. No.: 970,722

[22] Filed: Nov. 3, 1992

[51] Int. Cl.⁵ .............................................. B23K 11/24
[52] U.S. Cl. ...................................................... 219/110
[58] Field of Search .......................................... 219/110

[56] References Cited

U.S. PATENT DOCUMENTS

| | | | |
|---|---|---|---|
| 3,875,367 | 4/1975 | Tanaka | 219/110 |
| 4,465,918 | 8/1984 | Kiriyama et al. | 219/110 |
| 4,954,686 | 9/1990 | Izume | 219/110 |
| 4,973,814 | 11/1990 | Kojima et al. | 219/110 |

FOREIGN PATENT DOCUMENTS 63-16879  1/1988  Japan .................... 219/110

*Primary Examiner*—Clifford C. Shaw
*Attorney, Agent, or Firm*—Elizabeth E. Leitereg; Terje Gudmestad; W. K. Denson-Low

[57] ABSTRACT

An AC line voltage compensation method and controller for use with an AC welding system that is adapted to weld an article. Welding parameters are provided by an operator that are suitable for welding the article. A desired heating percentage is also input by the operator that is determinative of an RMS output voltage supplied by the AC welding system. The AC line voltage supplied to the AC welding system is measured by means of a voltmeter. The difference between the measured AC line voltage and a desired nominal AC line voltage is determined. The time at which heat is applied to the article is adjusted as a function of the measured difference to maintain the RMS output voltage supplied at the output of the AC welding system at a relatively constant level for all AC line voltages supplied to the AC welding system. More specifically, gain adjustment which provides for improved line voltage compensation, and which is controlled by means of a user programmed digital control panel, has been added to a line voltage compensation computational algorithm employed in an AC resistance welding controller. The use of the user programmed gain factor allows an operator to adjust the amount of compensation for a specific welding setup. The user adjusts the gain factor to modify a mathematically calculated term for line voltage compensation. The computed gain factor is used to set a variable time delay, after which an SCR is turned on. The variable time delay determines the phase angle of the AC pulse applied during each weld.

7 Claims, 4 Drawing Sheets

LINE VOLTAGE COMPENSATION FOR AC RESISTANCE WELDING SYSTEMS AND THE LIKE

BACKGROUND

The present invention relates generally to resistance welding and thermocompression bonding systems, and the like, and more particularly, to line voltage compensation for AC resistance welding controllers employed in AC resistance welding and thermocompression bonding systems in which output power remains constant.

Prior schemes for line voltage compensation employed in AC resistance welding controllers have included analog and digital methods. Resistance welding controllers manufactured by Hughes Aircraft Company and Unitek, for example, have utilized an analog line voltage compensation scheme wherein weld phase angle varies with line voltage. In addition, Hughes Aircraft Company has employed a digital line voltage compensation scheme in certain resistance welding systems where line voltage is measured periodically and a compensation factor is adjusted based on the line voltage.

However, these schemes do not have the ability to compensate for the frequency response (transfer function) of the load circuit comprising welding pulse transformer, cables, and weldments. Without the ability to compensate for the aforementioned, traditional compensation methods are subject to overcompensation. When line voltage increases, and compensation is applied, the energy delivered to weldments decreases, or vice-versa.

Careful measurements have indicated that conventional line voltage compensation methods, either analog or digital (based on computational analysis only) is capable of overcompensating for line voltage variations. That is, a line voltage change (230 volts to 240 volts, for example) which would theoretically cause an 8.8% power increase actually yields a reduction of 3% after compensation. It is believed that the cause of overcompensation is a somewhat complex response between the load resistance, the transformer inductance, and the harmonic of the phase controlled, voltage waveform.

Therefore, it is an objective of the present invention to provide for a line voltage compensation method for use in welders, such as resistance welding and thermocompression bonding systems, and the like, that eliminates the above-described overcompensation problem.

SUMMARY OF THE INVENTION

In order to eliminate overcompensation caused by conventional AC line voltage compensation methods, a gain adjustment which applies a variable gain factor, and which is controlled by means of a user programmed digital control panel, has been added to a line voltage compensation computational algorithm that is employed in an AC resistance welding controller. The gain factor in the line voltage compensation computational algorithm allows an operator to adjust the amount of compensation for a specific welding setup. The user adjusts the gain factor to modify a mathematically calculated term for the voltage compensation. The computed gain factor is used to set a variable time delay, after which an SCR is turned on. The variable time delay determines the phase angle of the AC pulse applied during each weld.

More specifically, the present invention comprises an AC line voltage compensation method for use with an AC welding system that is adapted to weld an article. Welding parameters are provided for welding the article and a desired heating percentage that is determinative of an RMS output voltage supplied by the AC welding system is provided. The AC line voltage supplied to the AC welding system is measured and the difference between the measured AC line voltage and a desired nominal AC line voltage is determined. The time at which heat is applied to the article as a function of the measured difference is adjusted to maintain the RMS output voltage supplied at the output of the AC welding system at a relatively constant level for all AC line voltages supplied to the AC welding system.

The present invention also provides for a controller for use with an AC welding system that comprises a switch, a power supply, a welding transformer and a weld head adapted to weld an article, and wherein the controller is adapted to provide AC line voltage compensation. The controller comprises input means, such as a touch sensitive display panel, for providing a desired heating percentage that corresponds to an RMS output voltage supplied by the AC weld head. Measurement means, such as a voltmeter, are provided for measuring the AC line voltage supplied by the power supply. Comparator means is provided, which may be implemented by a software algorithm, for determining the difference between the measured AC line voltage and a desired nominal AC line voltage. Adjustment means, such as may be provided by the touch sensitive display or keypad, is provided for modifying the time at which heat is applied by the weld head to the article to maintain a relatively constant RMS voltage supplied weld head at all line voltages, and hence to compensate for variations in AC line voltage.

The use of this variable gain factor, although it appears simple in concept, was implemented in light of extensive analysis and testing that was empirically performed on resistance welding equipment. It was determined from weld power measurements uncovered during the tests that there is a compensation dependency that is a function of the low-pass filter characteristics of the transformer, power cables, and weldments as a whole. Proper adjustment of the line voltage compensation gain factor using the present invention, yields the most effective level of voltage compensation.

The present invention improves welding consistency by fine tuning the line voltage compensation to account for the frequency response of the welding transformer, cables, and weldments. Line voltage compensation is used on AC welding controllers so the power delivered to the weldments remains constant regardless of line voltage fluctuations. Specifically, the present invention adds a gain term to the mathematical algorithm that calculates weld phase angle corrections for changes in line voltage.

The present invention improves line voltage compensation and thereby improves process control. By allowing the user to test and set a gain term, the compensation algorithm accommodates a significant number of variables that cannot be predicted.

The present invention provides improved line voltage compensation for AC resistance welding controllers. In particular, Hughes has added it to the HAC-1000 AC welding controller. This compensation technique has been extensively tested on TRW-Technar's production line for automotive air bag sensors and represents a significant improvement to the state of the art.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1A:
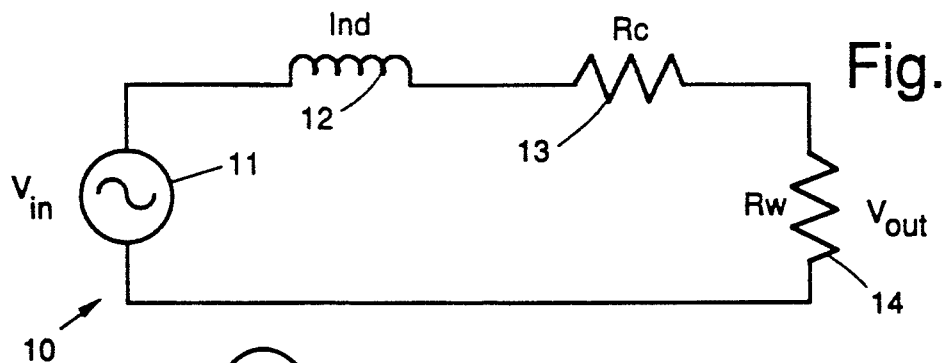
FIGS. 1a-1c illustrate a typical welding system and energy waveforms associated therewith that are useful in understanding the present invention.
Figure 1B:
Figure 1C:
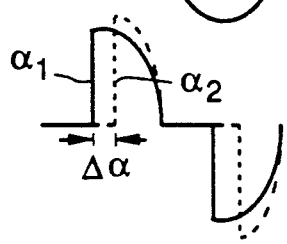

Referring to the drawing figures, FIGS. 1a-1c illustrate a conceptual model of a typical resistance welding system 10 and energy waveforms associated therewith that are useful in understanding the present invention. In general, a resistance weld is made by pressing two pieces of metal together while a heavy electric current is passed through them for a very sort time duration. The two metals are heated to welding temperature at their contacting surfaces by the resistance offered to the flow of current. In resistance welding, this temperature is in the plastic range of the metals. If molten metal temperatures are reached, expulsion (sparks) take place instead of a weld. Because pressure is used to forge the heated parts together, the grain structure of the metal is refined, therefore producing a weld with physical properties in most cases equal to the parent metals. Very short times are required to produce the welding temperature.

Figure 2:
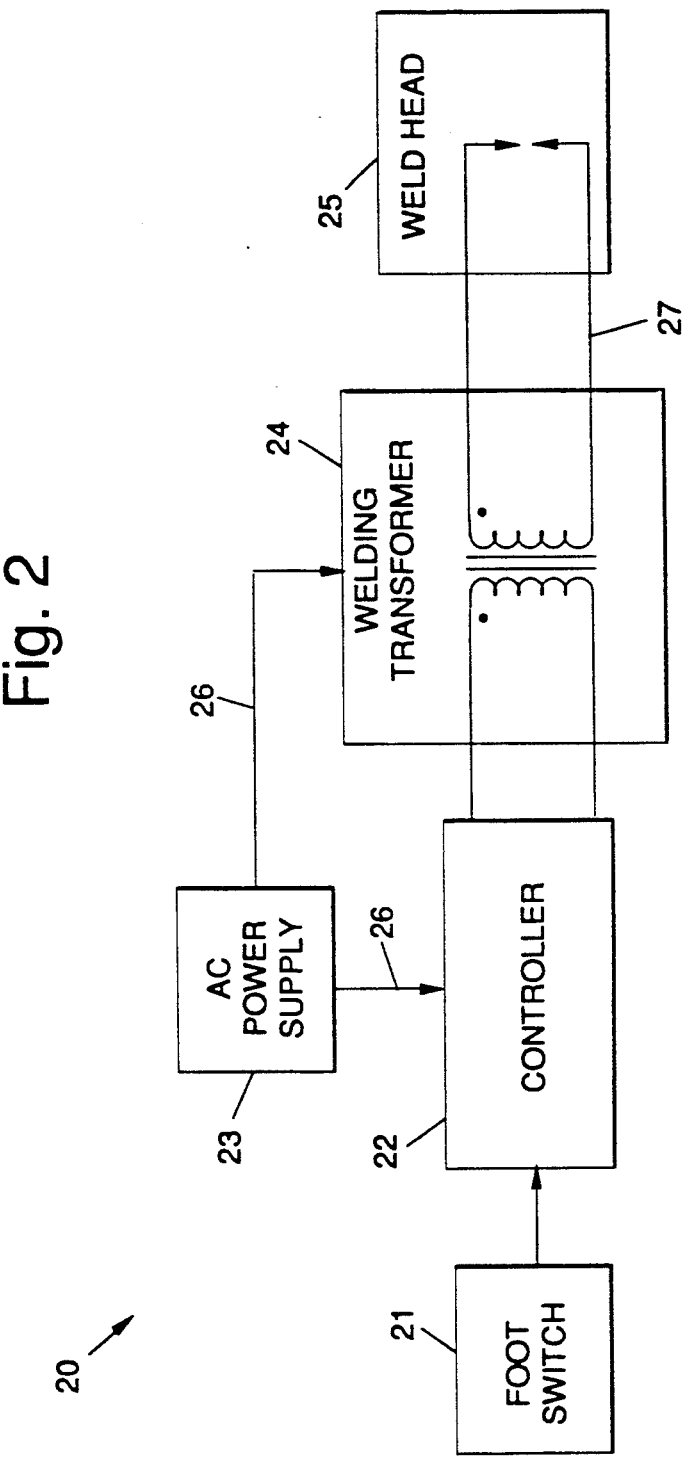
FIG. 2 illustrates a block diagram of an AC welding system that may be adapted to incorporate line voltage compensation in accordance with the principles of the present invention.

The AC welding system model 10 is comprised of four devices as is shown in FIG. 12. These are a voltage generator 11, an inductor 12, a resistor 13 (Rc), and the resistance of the weldments 14 (Rw). In order to better understand the design and operation of the welding system 10, a Hughes Aircraft Company model HAC-1000 resistance welding system 20 will be used for illustrative purposes, and it is illustrated in FIG. 2. The HAC-1000 system 20 is comprised of a foot switch 21, a controller 22, an AC power supply 23, a welding transformer 24 and weld head 25. The HAC-1000 system 20 is commercially available and is generally well-known in the industry. The operation of this system 20 is also generally well known to those skilled in the art of resistance welding.

Referring again to FIG. 1a the voltage generator 11 represents the AC power supply 23 of the system 20. The inductor 12 represents the composite inductance attributed to power lines 26, the welding transformer 24, and output cables 27 of the system 20. In any given welding system the value of this inductance is generally constant. The resistor 13 (Rc) is a composite component representing the aggregate effect of resistive losses caused by the resistance of the windings of the transformer 24 and the resistance of the output cable 27. Typically, 50% of the energy issued by the power supply 23 is lost in the resistor 13 (Rc). Also, as heat is dissipated in the resistor 13 (Rc), it will heat up and consequently increase in value. Line voltage compensation cannot measure this change in distribution losses and hence, cannot compensate for this change in system efficiency because the changes occur beyond the measurement point. The resistance of the weldments 14 (RW) is typically near 1 milliohm and essentially remains constant.

With regard to AC line voltage compensation, the HAC-1000 system 20 illustrated in FIG. 2, for example, has heretofore implemented analog or digital line compensation as was described in the Background section. The system 20 accepts weld schedule input parameters from an operator and then causes the power supply 23 to provide welding energy to the weld head 25 upon demand, typically by pressing the foot switch 21. The HAC-1000 system 20 contains an 8 bit, internal voltmeter to measure the AC line voltage. A software algorithm implemented in the controller 22 fires output SCRs at an appropriate time based on a PERCENT HEAT setting specified by the operator as one of the input parameters. When using line voltage compensation, the timing of SCR firing is modified slightly as the AC line voltage drifts above and below a nominal voltage of 230 volts. The purpose of this timing adjustment is to maintain the same RMS voltage at the output of the system 20 at all line voltages.

However, it has been determined that, in an AC welder, such as the HAC-1000 system 20, a frequency response of a load circuit comprising the inductance of the transformer 24, the resistance of the output cable 27, and the weldment resistance 14 has an electrical low pass filter characteristic which allows most of the energy with a frequency of 60 Hertz to pass from the power supply 23 to the output at the weld head 25. Some of the energy at 180 Hertz pass through the filter, and almost none of the energy at 300 Hertz passes through the filter. This selective frequency sensitivity is what we call the Fourier characteristics.

Table 1 illustrates what happens in the welding system 20 when the transformer 24 and weldments form a low pass filter which allows all of the 60 Hz energy, half of the 180 Hz energy and none of the 300 Hz energy to pass from the input to the output of the filter. The table identifies two line voltages, 230 and 240 volts. In the nominal output power with no compensation, the output power increases by 8.8% as voltage increases from 230 to 240 volts. The 'PERCENT HEAT requested' line indicates that the operator desires 50% heat regardless of line voltage. In the 'PERCENT HEAT calculated by compensation algorithm' line, with line voltage compensation operating, the PERCENT HEAT setting is adjusted by the software algorithm from 50% to 45% as the line voltage increases. In the 'Welder output energy at 60, 180 and 300 hertz' lines of Table 1, with line voltage compensation, the percentage of energy at 60, 180, and 300 Hertz changes as the voltage goes up. The, 'Total energy at output of welding supply ' line shows that the total energy output energy from the welder remains constant even though the line voltage increased. The 'Weldment energy at 60, 180 and 300 hertz' lines describe the effects of applying the output energy to the filter when the transformer 24 and weldments form a low pass filter which allows all of the 60 Hz energy, half of the 180 Hz energy and none of the 300 Hz energy to pass from the input to the output of the filter. On the 'Total weldment energy' line, the 60 Hz energy goes down, and energy goes up at the other two frequencies. The total energy delivered to the weldments actually decreases as a result of the change in the harmonic content and the filtering action. Because of this, the total energy decreased by 3%.

TABLE 1

| Line voltage | 230 volts | 240 volts |
|---|---|---|
| Nominal output power with no compensation (relative to 230 volts) | 100% | 108.8% |
| PERCENT HEAT requested (example) | 50% | 50% |
| PERCENT HEAT calculated by compensation algorithm | 50% | 45% |
| Total energy at output of welding supply (input to low pass filter) | 100% | 100% |
| Welder output energy at 60 hertz | 75% | 70% |
| Welder output energy at 180 hertz | 22% | 26% |
| Welder output energy at 300 hertz | 3% | 4% |
| Total weldment energy | 86% | 83% |
| Weldment energy (output of low pass filter) at 60 Hz | 75% | 70% |
| Weldment energy at 180 Hz 50% of Total energy at 180 hertz | 11% | 13% |
| Weldment energy at 180 Hz (50% of Total energy at 480 hertz) | 0% | 0% |

In summary, if the AC line voltage increases and there is no correction, there is an increase in output energy, but if compensation is applied, the new PERCENT HEAT setting causes a decrease in output energy. Therefore, there must be some value of partial correction to the PERCENT HEAT setting which is just right. Implementation of a partial correction to the PERCENT HEAT value is what is achieved by the line voltage compensation method of the present invention.

Changes made to PERCENT HEAT settings with the algorithm used in the HAC-1000 system 20 prior to the present invention were maximum changes. However, the algorithm employed in the present invention makes only a portion of the maximum change, thereby reducing or eliminating overcompensation. This is achieved by introducing a fraction into the calculations. The fraction employed in a specific embodiment of the present invention is a number divided by 32. If the operator enter the number 25, the correction factor is 25/32. That means that the change in PERCENT HEAT will only be 25/32 of the maximum change.

Figure 3:
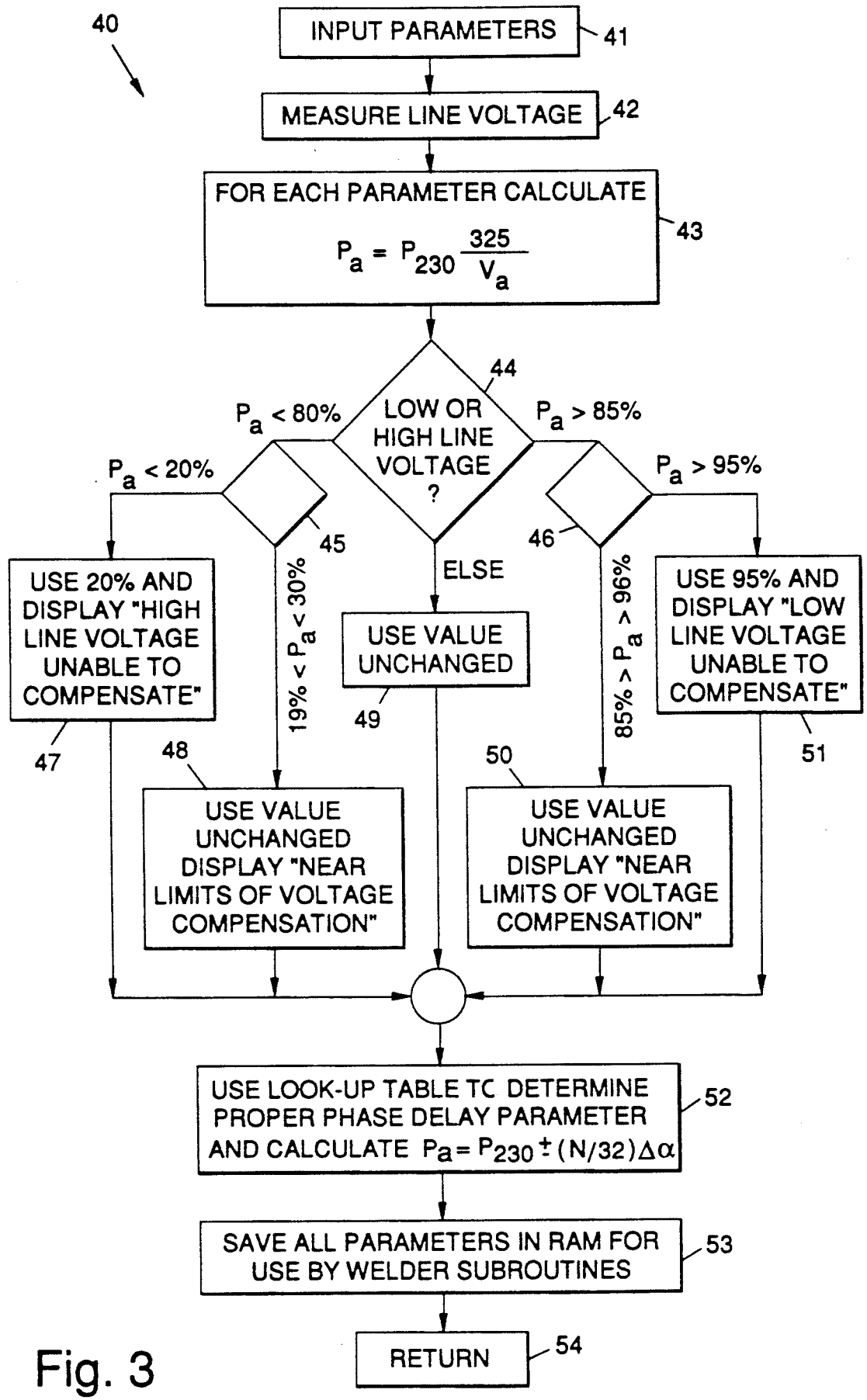
FIG. 3 shows a flow diagram that implements line voltage compensation of the present invention in the AC welding system of FIG. 2.

To understand the present invention in more detail, reference is made to FIG. 3 which shows a flow diagram of a method 40 that implements line voltage compensation in accordance with the principles of the present invention in the AC welding system 20 of FIG. 2. The method 40 will be described with reference to its use in the HAC-1000 system 20 described above. The method 40 comprises the following steps. The first step 41 is for an operator to input a number of parameters that are required by the system 20. These parameters include for channel 1, 80% (% WELD), 4 cycles.

The value of the actual line voltage ($V_a$) is then measured in the second step 42 using the above-mentioned voltmeter. A predetermined value for the line voltage 230 volts ($V_{230}$) which is the nominal operating voltage for the system 20. In step 43, for each of the parameters an actual percent heat applied $P_a$ is determined from $P_a = P_{230} (V_{230}/V_a)$, where $P_{230}$ is the percent heat applied at the nominal operating voltage $V_{230}$. $P_a$ is a variable that controls the power to the weldments. Depending upon the value of $P_a$, a variety of calculations are made (illustrated by decision boxes 44-46) and different display readouts (boxes 47-51) are displayed on the LCD display of the HAC-1000 system 20. When each value of actual percent heat applied $P_a$ is calculated (five different values, based upon each of the different conditions 44-47, 49 and 51), a lookup table is used to determine a desired phase delay parameter in step 51. The phase delay parameter is then used as the value by which the SCRs are delayed prior to firing and delivering current to the weld head 25. FIGS. 1b and 1c illustrate a full sine wave and a phase controlled sine wave, respectively. All parameters and determined values are then stored in a memory in step 53 for use by welding subroutines employed in the HAC-1000 system 20. After storage of the parameters, the method transfers control to a calling program in step 54 which then implements the welding routines.

The algorithm and the lookup table that comprises the phase delay parameters are generated based upon the following. Assume a sine wave having amplitude (peak voltage) $V_p$ defined by:

$$V = V_p \sin(\Phi t). \qquad \text{(Equation 1)}$$

The general solution to finding an RMS solution is to compute the square root of the sum of the squares of each data point.

$$RMS = \frac{1}{T} \sqrt{\int_\alpha^T [f_x]^2 dx} \qquad \text{(Equation 2)}$$

The limits of integration are established from $\alpha$ to T with $\alpha$ being the point at which the SCR turns on and $T = \pi$. For a full half cycle, the RMS voltages is $$V_t = V_p(\tfrac{1}{2})^{\frac{1}{2}}. \qquad \text{(Equation 3)}$$

Establish a variable $P_{230}$ (also known as Percent Heat). $P_{230}$ is an operating parameter chosen by the operator. $P_{230}$ represents the desired percentage of the maximum possible true RMS voltage when the SCRs are turned on for 180 degrees. Thus, the true RMS voltage for an arbitrary choice of percent and for the ideal case of a line voltage of 230 volts RMS ($V_p = 325$) is $$P_{230} = 325 \, (\tfrac{1}{2})^{\frac{1}{2}}. \qquad \text{(Equation 4)}$$

To accomplish voltage compensation, assume that the percentage parameter which is input by the operator is correct if the line voltage is exactly 230 volts RMS. Further, assume that the actual line voltage $V_a$, can be measured. The task of the compensator is to determine a value, $P_a$, which will make the RMS value of the actual voltage to be equal to the RAMS value of a phase-controlled 230 volt signal.

$$P_{230} * 325(\tfrac{1}{2})^{\frac{1}{2}} = P_a * V_a (\tfrac{1}{2})^{\frac{1}{2}}, \qquad \text{(Equation 5)}$$

or by rearranging and solving for $P_a$:

$$P_a = P_{230} 325/V_a, \quad \text{(Equation 6)}$$

expressing the new, actual Percent Heat for the new voltage in terms of the original Percent Heat (P230) and the present actual voltage ($V_a$).

Having computed a new value for Percent Heat, the computer then applies a lookup table to convert the value of $P_a$ into a timing delay value which is used to control the firing angle of the SCRs.

The lookup table is developed as follows. Equation 3 describes the RMS value for a full half cycle (100%). For an arbitrary percentage, P, the RMS voltage is $$V_{RMS} = P * V_p(\tfrac{1}{2})^{\tfrac{1}{2}}, \quad \text{(Equation 7)}$$

Also, for an arbitrary firing angle, $\alpha$, which corresponds to P, $$V_{RMS} = V_p/2[2 - (2\alpha/\pi) + \sin(2\alpha)\pi] \quad \text{(Equation 8)}$$

After equating equations 7 and 8, solve for P, $$P = [1 - \alpha/\pi + \sin(2\alpha)/2\pi]^{\tfrac{1}{2}}, \quad \text{(Equation 9)}$$

then find $\alpha$ as a function of P. This can be accomplished by the following numerical solution. Solve equation (9) for all values of $\alpha$ where $$\alpha = (N^*\pi)/1000, N = 0 \text{ to } 1000) \quad \text{(Equation 10)}$$

Select 80 values of $\alpha$ which correlate to the 80 values of P which are closest to the integers (P=20,21,22, ... 99). These 80 values of $\alpha$ are converted to time delays and then into a quantity of clock pulses. The delay counter chip is clocked at 2 MHz. Since at 60 Hz there are 120 half cycles per second, there are 16,667 (2,000,000/120) clock pulses per half cycle. Each phase delay angle is converted to [($\alpha/\pi$)(2,000,000/120)] clock pulses and then entered into the lookup table.

Presented below is an application example illustrative of the operation of the present invention. Assume the line voltage to be 230 volts and the desired percent heat is 55%. The computer would use the lookup table to determine the correct number of delayed clock pulses before firing an SCR. If the voltage were to increase, the welder would measure the new voltage, recognize the changing condition, and then compute the corrected time delay (corresponding to 53%) which provides the same RMS voltage at 240 volts as was delivered to the weld site at 230 volts.

When changes in line voltage are not compensated, the output voltage of the welder is proportional to the changes in line voltage. When the original algorithm is applied, the actual firing angle of the SCRs is modified in an attempt to maintain a constant RMS output voltage. Unfortunately, as stated before, the results of the algorithm do not account for the low pass filtering effects of the system inductance and resistance. As a result, overcompensation occurs at the weld site. The present invention modifies the calculations of the original algorithm to determine a firing angle between the noncompensated value and the overcompensated value. FIG. 1c illustrates the change in firing angle (or correction factor) $\Delta\alpha$ which is equal to the difference between the noncompensated value $\alpha_1$ and the overcompensated value $\alpha_2$ (represented by the dotted line), where $\Delta\alpha = \alpha_1 - \alpha_2$.

Using the original algorithm, the actual Percent Heat at the present power line voltage is equal to the percent Heat which would be applied at 230 volts plus or minus a correction factor.

$$P_a = P_{230} \pm \Delta\alpha. \quad \text{(Equation 11)}$$

The present invention adds another correction factor to the previously described algorithm which is simple for a typical user to apply. A rigorous mathematical solution may also be implemented, but such a solution would not be easy for non-technical personnel to apply.

$$P_a = P_{230} \pm (N/32)(\Delta\alpha). \quad \text{(Equation 12)}$$

The operator must then empirically determine the best value for N, which is typically between 25 and 31, and which will yield optimal compensation over the normal range of the line voltage.

Figure 4:
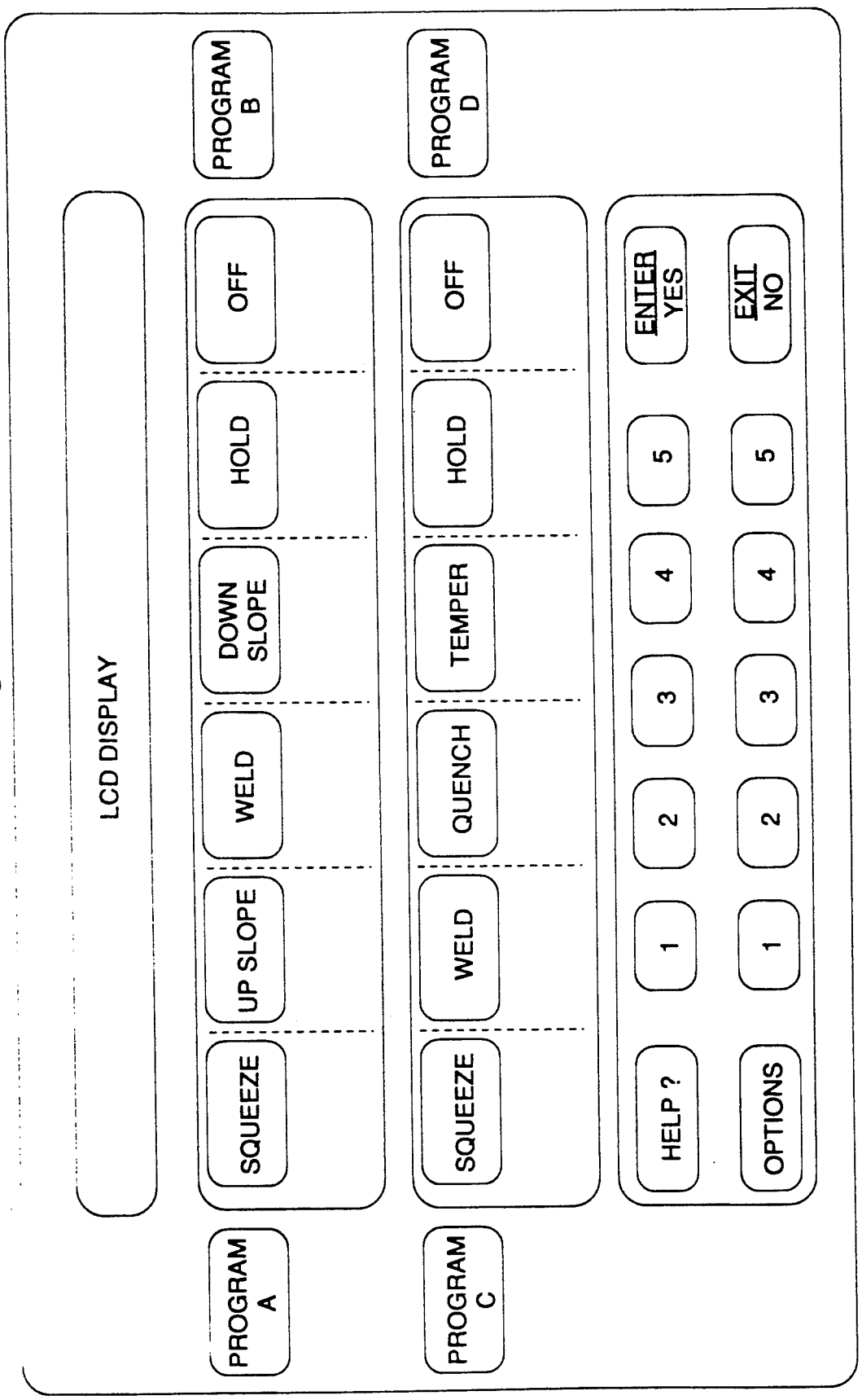
FIG. 4 illustrates a front panel of the AC welding system of FIG. 2 which is useful in explaining the operation of the present invention.

Since the correct number changes for each type of transformer 24 and different welding output cables 27, the correction number was established as a variable controlled by the operator. The nominal number issued by the factory is 32, that is, no correction. Referring to FIG. 4, it illustrates a front panel of the HAC-1000 system, and is useful in explaining the operation of the present invention. In general, the operation of the HAC-1000 system is well known to those skilled in the art. For the HAC-1000 system 20, the correction number is edited using the following sequence of commands: OPTIONS "2"→RMS time base→Voltage compensation=ON,→compensation number.

Figure 5:
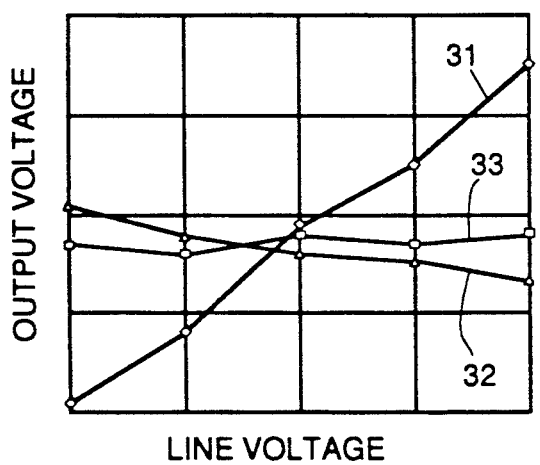
FIG. 5 is a graph illustrating the improvements provided the present invention compared to the conventional line voltage compensation technique.

Extensive testing of the present invention verified its improvement on weld consistency. The graph of FIG. 5 shows the output voltage from the welding transformer of the HAC-1000 system as a function of line voltage. The steepest curve 31 (marked with diamonds) shows the change in output voltage without any compensation. The curve 32 marked with triangles shows the output voltage with methematically calculated line voltage compensation. The final curve 33 (marked with squares) shows the line voltage compensation with a gain term of 25/32 applied.

Figure 6:
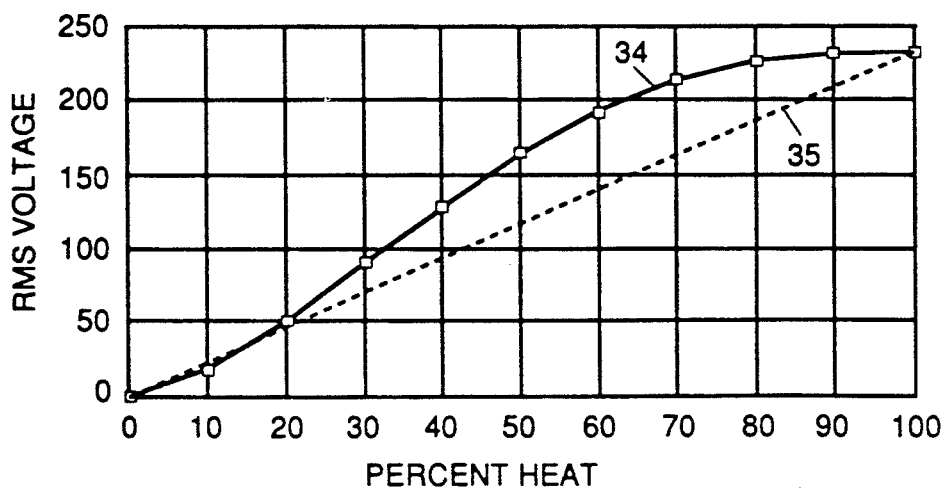
FIG. 6 is a graph comparing the present invention to conventional linear line voltage compensation.

FIG. 6 is a graph comparing the RMS line voltage compensation method of the present invention to conventional linear line voltage compensation. An ideal curve 35 would be a straight line at a constant voltage. For this setup a curve 34 marked with squares is the closest approximation to the ideal. Further, since the power delivered to the weldments in a function of the square of the output voltage of thee transformer, small improvements yield significant dividends in weld consistency.

Thus there has been described a new and improved line voltage compensation for use in AC resistance welding controllers employed in resistance welding and thermocompression bonding systems, and the like. It is to be understood that the abovedescribed embodiment is merely illustrative of some of the many specific embodiments which represent applications of the principles of the present invention. Clearly, numerous and other arrangements can be readily devised by those skilled in the art without departing from the scope of the invention.

What is claimed is:

1. An AC line voltage compensation method for use with an AC welding system that is adapted to weld an article, said method comprising the steps of:

providing welding parameters for welding the article.

providing a desired heating percentage $P_{230}$ that is determinative of an RMS output voltage $V_{rms}$ supplied by the AC welding system;

measuring an AC line voltage $V_a$ supplied to the AC welding system;

determining the difference between the measured AC line voltage $V_a$ and a desired nominal AC line voltage $V_{230}$;

adjusting an actual percent heat applied $P_a$ to the article as a function of the heating percentage $P_{230}$ and the measured difference between $V_{230}$ and $V_a$; and further adjusting the actual percent heat applied $P_a$ to correct for frequency filtering effects of system inductance and resistance comprising the steps of;

manually providing a number N ranging from 0 to 32; and correcting the actual percent heat applied $P_a$ by a fraction N/32.

thereby maintaining the RAMS output voltage supplied at the output of the AC welding system at a relatively constant level for all AC line voltages supplied to the AC welding system.

2. The method of claim 1 wherein the step of adjusting an actual percent heat applied $P_a$ to the article comprises the step of:

adjusting a phase delay $\alpha$ at which a plurality of SCRs are fired which determine an amount of heat supplied to the article, and wherein the step of correcting the actual percent heat applied $P_a$ uses the equation $$P_a = P_{230} \pm (N/=)\Delta\alpha$$

where $\Delta\alpha$ is a phase delay correction factor.

3. The method of claim 1 wherein the step of adjusting the time at which heat is applied to the article is comprises of the step of adjusting the time at which a plurality of SCRs are fired in response to AC line voltage drift above and below the nominal line voltage.

4. A controller for use with an AC welding system that comprises a switch, a power supply, a welding transformer and a weld head adapted to weld an article, wherein the controller is adapted to provide AC line voltage compensation, said controller comprising:

input means for providing a desired heating percentage $P_{230}$ that corresponds to an RMS output voltage supplied by the AC weld head;

measurement means for measuring AC line voltage $V_a$ supplied by the power supply;

comparator means for determining the difference between the measured AC line voltage $V_a$ and a desired nominal AC line voltage $V_{230}$;

adjustment means for modifying an actual percentage heat applied $P_a$ by the weld head to the article to maintain a relatively constant RMS voltage supplied to the weld head at all line voltages, and hence to compensate for variations in AC line voltage, wherein the actual percentage heat applied $P_a = P_{230} \pm \Delta\alpha$, where $\Delta\alpha$ is a correction factor for phase delay in which a plurality of SCRs are fired; and further adjustment means for correcting for frequency response of a load circuit comprising the transformer having inductance, output cables and weldments each having resistance, the further adjustment means comprising a further correction factor N/32, where N is a manually input value ranging from 0 to 32, such that the actual percent heat applied $$P_a = P_{230} \pm (N/32)\Delta\alpha$$

5. The controller of claim 4 wherein the input means comprises a touch sensitive input device.

6. The controller of claim 4 wherein the measurement means comprises a voltmeter.

7. AN improved controller for use with an AC welding system adapted to weld an article, wherein the system comprises a power supply, by welding transformer and a weld head coupled to the article by means of welding cables, and wherein the controller is adapted to provide AC line voltage compensation, the improvement comprising:

variable compensation means, coupled to the welding transformer, the weld head and the welding cables, for variably controlling the AC line voltage compensation said variable compensation means comprising a variable gain factor N/32 which adjusts said AC line voltage compensation for frequency responses of a load circuit comprising the welding cables, welding transformer, weld head, and weldments of the article, wherein N is an operator determinable manually input variable ranging from 0 to 32.

* * * * *